UNITED STATES PATENT OFFICE.

GERHARD NICOLAAS VIS, OF PARIS, FRANCE.

PROCESS OF SPLITTING DOUBLE SULFATES AND WASHING THE SPLIT PRODUCTS.

1,364,822. Specification of Letters Patent. Patented Jan. 4, 1921.

No Drawing. Application filed December 18, 1918. Serial No. 267,350.

*To all whom it may concern:*

Be is known that I, GERHARD NICOLAAS VIS, of 10 Rue de Vienne, Paris, France, chemist, have invented a new and useful Process of Splitting Double Sulfates and Washing the Split Products, which process is fully set forth in the following specification.

This invention relates both to a simplification in the method of carrying out the process described in my applications for United States Patents Serial Nos. 259,681 and 259,682, and to the effecting of an economy in the washing of the ammonium sulfate, separated from its solution by cooling, and mixed with sodium sulfate.

As stated in the specifications 259,681 and 259,682 a double salt:

$$Na_2SO_4.(NH_4)_2SO_4.4H_2O$$

is formed when gases containing ammonia are led through a solution of convenient concentration of bisulfate of sodium. By dissolving this double salt in a solution of sulfate of ammonia or in the mother liquors resulting of the process and containing large quantities of sulfate of ammonia with some sodium sulfate and heating the suspension of the salt at about 100 to 110° C., a splitting takes place and anhydrous sulfate of sodium is separated.

After filtration of the anhydrous sodium sulfate the liquor is cooled down to about 60° C. Then ammonium sulfate mixed with about 10% of sodium sulfate will crystallize and is to be washed. The mother liquor obtained after filtering of the above said mixture of salts is partially evaporated to get rid of the water, introduced the crystallization water of the double salt $$Na_2SO_4.(NH_4)_2SO_4.4H_2O$$

and the concentrated mother liquor is reused for splitting up new quantities of double salt.

Instead of carrying out this evaporation, which is a necessity owing to the introduction of water into the cycle by the double salt $$Na_2SO_4.(NH_4)_2SO_4.4H_2O,$$

I have discovered that an improvement may be effected by freeing this double salt from its water of crystallization before splitting the salts as above described. With this end in view, I subject the above double salt to heat sufficient to drive off the water without decomposing the ammonium sulfate in the double salt. In this case the continuity of working is equally well assured and there is no longer any need for evaporators, the installation of which in large factories necessitates complicated apparatus (multiple effect) which need special attention.

The use of the double salt previously freed from its water is especially recommended if waste heat is available.

Moreover, the specifications Serial Nos. 259,681 and 259,682 recommend that the ammonium sulfate (separated by the means described) should be freed from the adherent sodium sulfate by washing with water or with a solution of ammonium sulfate.

This invention has for its object a means of washing in as economical a manner as possible and without producing washing waters which in one way or another have to be concentrated or removed from the cycle.

If ammonium sulfate, which contains beside the mother liquors about 10% of sodium sulfate, is washed at a temperature of about 60° C., with a solution saturated at 15° C., for example, with sodium sulfate and ammonium sulfate, this solution will dissolve for 100 kgs of water about 10 kgs of ammonium sulfate and 25 kgs of sodium sulfate. Therefore by using a sufficient quantity of this solution it is easy to remove all the sodium sulfate mixed with the ammonium sulfate without dissolving at the same time much ammonium sulfate. The quantities of the two salts coming into solution are in the proportion of 2.5 to 1.

The advantage of washing the ammonium sulfate with the before mentioned solution is greater if this solution, saturated with sodium sulfate and ammonium sulfate by its passage over the ammonium sulfate containing sodium sulfate at a temperature of 60°, is afterward cooled to 15°. A quantity of the double salt above referred to corresponding to the quantity of sodium sulfate which has entered into solution separates out. This double salt is collected and enters again into the working cycle while the mother liquors serve (either as such or after the addition of 10 kgs of ammonium sulfate for 100 kgs of water) to extract the 10% of sodium sulfate from a fresh quantity of ammonium sulfate to be washed.

The process allows therefore to remove all the sodium sulfate which crystallizes at the same time as the ammonium sulfate from this latter salt and to obtain a sulfate of ammonia containing traces only of sulfate of sodium. It is a continuous working process in a closed cycle, which allows a purification of the sulfate of ammonia, sacrificing the least possible quantity of sulfate of ammonia, therefore extremely economical and simple.

The ammonium sulfate washed according to the above described process is afterward if desired freed as much as possible from its adherent mother liquors, for example, by centrifugal action, with, if required, a spraying with water or with a concentrated solution of ammonium sulfate, and it is thus easy to obtain as a result chemically pure ammonium sulfate.

Claims:

1. The improvement in the process of splitting the double salt

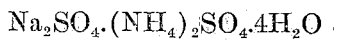

$$Na_2SO_4.(NH_4)_2SO_4.4H_2O$$

consisting in dehydrating said salt, heating the dehydrated product in a solution containing ammonium sulfate, removing the anhydrous sodium sulfate separated from the solution, cooling the latter solution to separate ammonium sulfate mixed with about 10% of sodium sulfate and returning the liquid portion to said working cycle.

2. The method as defined in claim 1 wherein said solution separated from the anhydrous sodium sulfate containing ammonium sulfate and sodium sulfate is cooled to about 60° C. to precipitate sulfate of ammonium mixed with about 10% of sodium sulfate, washing the said precipitated salts at about 60° C. to remove sodium sulfate with a cold saturated solution of sodium sulfate and ammonium sulfate, refrigerating the washing liquid to separate a portion of the contained salts and applying the liquid portion for washing a fresh portion of crude ammonium sulfate.

In testimony whereof I have signed this specification.

GERHARD NICOLAAS VIS.

Witnesses:
  GASTON DE MESTRAL,
  JOHN F. SIMONS.